United States Patent [19]

Gresch

[11] Patent Number: 5,510,125
[45] Date of Patent: Apr. 23, 1996

[54] PROCESS FOR SELECTIVE REMOVAL OF SUGAR FROM BEVERAGES

[75] Inventor: Walter Gresch, Niederweningen, Switzerland

[73] Assignee: Bucher-Guyer AG Maschinenfabrik, Niederweningen, Switzerland

[21] Appl. No.: 378,253

[22] Filed: Jan. 24, 1995

Related U.S. Application Data

[63] Continuation of Ser. No. 291,848, Aug. 17, 1994, abandoned, which is a continuation of Ser. No. 460,330, Dec. 28, 1989, abandoned.

[30] Foreign Application Priority Data

May 4, 1988 [CH] Switzerland ............... 1672/88

[51] Int. Cl.⁶ .................................................. A23L 1/015
[52] U.S. Cl. ........................ 426/11; 426/12; 426/13; 426/14; 426/15; 426/16; 426/425; 426/486; 426/487; 426/493
[58] Field of Search .................. 426/11, 12, 13, 426/14, 15, 16, 425, 487, 493, 486

[56] References Cited

U.S. PATENT DOCUMENTS

| | | | |
|---|---|---|---|
| 4,626,437 | 12/1986 | Schobinger et al. | 426/387 |
| 4,806,366 | 2/1989 | Dick et al. | 426/15 |

FOREIGN PATENT DOCUMENTS 0174594  3/1986  European Pat. Off. .

*Primary Examiner*—Helen Pratt
*Attorney, Agent, or Firm*—Edmund M. Jaskiewicz

[57] ABSTRACT

To remove selectively particularly sugar from nonalcoholic or alcoholic beverages, first the sugar is either carried away in the permeate in a membrane separation unit (2) by suitable choice of membrane (4) or is retained in the retentate. Afterward, the sugar is removed from the permeate or from the retentate with the help of a device (5) for substance removal or substance conversion. Next the substances remaining in the permeate or in the retentate after the removal of the sugar are fed back into the process or the final product. With the process according to the invention, a high selectivity and an improvement in quality of the final product with high economic efficiency of the unit is achieved (FIG. 1).

22 Claims, 2 Drawing Sheets

PROCESS FOR SELECTIVE REMOVAL OF SUGAR FROM BEVERAGES

This is a continuation of application Ser. No. 08/291,848 filed on Aug. 17, 1994, now abandoned, which was a continuation of application Ser. No. 07/460,330 filed Dec. 28, 1989, now abandoned.

FIELD OF THE INVENTION

The invention relates to a process for selective removal of nonvolatile substances, such as sugar and/or acid and/or substances that cause a bad taste, from nonalcoholic or alcoholic beverages by membrane separation processes.

DESCRIPTION OF THE RELATED ART

The main application of the invention is the desugarization of largely alcohol-free beverages and in addition also the deacidification and general refining of alcohol-free as well as of alcoholic beverages (e.g., wine, beer) made of natural products such as fruits, berries, grapes, vegetables, grains, soy and products of livestock husbandry, e.g., milk. By the removal of bad taste and acids is mainly meant general refining. The above-mentioned substances to be removed are nonvolatile, Parallel with the removal of said nonvolatile substances, volatile substances, e.g., imperfect flavoring, can also be removed if desired. The portion of all the substances to be removed amounts here to less than 25%. Desugarization, and to a more limited extent also the deacidification and refining of beverages, are used to comply with the need of consumers for fewer calories, less sweetness, suitability for diabetics, less acid, etc.

Various chemical processes are already known for desugarization. DE-PS 22 32 093 relates to extracting sugar from molasses according to the ion exclusion resin process. Here, the sugar-containing molasses is conveyed through a column filled with ion-exchange resin, separating the sugar. Another process for extracting sucrose from molasses is known from U.S. Pat. No. 3,997,357. The sugar-containing molasses is mixed with lime and the sucrose is extracted by subsequent filtering. Finally, EP-OS 0 047 518 shows a process in which the sucrose is extracted by contact of the sugar-containing mixture with adsorbers.

These known chemical processes yield an insufficient quality for beverage purposes, since the desugarization is not selective enough. The object of these processes is above all the extraction of sugar, for which purpose selectivity is of secondary importance.

The use of membrane separation processes is known in the art for dealcoholization of beverages. Here, the volatile alcohol substances are carried away through the membrane into the permeate. But these known dealcoholization processes cannot easily be transferred to the removal of sugar from beverages because of the considerably higher molecular weight and the nonvolatile compounds such as sugar, acid, taste substances and are also not suited for this purpose. For this reason, dealcoholization by membrane processes must use membranes with very low separation limits. With the use of reverse osmosis and reverse osmosis combined with dialysis, it is in the range of pure reverse osmosis, e.g., 92–99% salt retention, relative to 0.5% aqueous NaCl solution, 40 bars transmembrane pressure and 20° C. process temperature. Further, the separation of alcohol from the permeate circuit is performed by so-called liquid-volatile separation processes, e.g., distillation, thus nonvolatile components, such as sugar, acid, taste substances cannot be separated nonselectively.

SUMMARY OF THE INVENTION

Thus the object of the invention is to avoid the drawbacks mentioned and to provide a process of the type mentioned above that guarantees an improvement in the quality of the final product with greater economic efficiency.

This object is achieved according to the invention in that, after performing the membrane separation process, the separated substance is removed or converted from the permeate or the retained substance is removed or converted from the retentate by physical, chemical or biotechnological processes and subsequently the substances remaining after removal or conversion are at least partially fed back into the process or to the final product.

The performance of the unit is increased if the membrane separation process consists of a combination of dialysis and reverse osmosis and the separation is performed by increased transmembrane pressure and by a difference in concentration.

Advantageously, the separation area of the membrane separation unit is in the boundary area between the low-molecular and the macromolecular or in the boundary area between reverse osmosis and ultrafiltration.

According to another embodiment feature of the invention, the membrane separation unit operates according to the ultrafiltration process with a separation limit of a maximum of 5,000 daltons.

To remove the substance from the permeate or from the retentate of the membrane separation unit, know physical processes such as chromatographic processes, sheet filters, taste-modifying cellar treatment processes and liquid/liquid extraction processes as well as chemical processes such as known chemical precipitation processes, among other things, for use in the separation of nonvolatile substances, can be used advantageously.

For substance removal by substance conversion, biotechnological processes such as fermentation and enzymatic processes are advantageously used.

According to another feature of the invention, the permeate of the membrane separation unit is circulated at least partially and the device for substance removal or substance conversion is placed in the permeate circuit.

The efficiency of the unit is improved by feeding the permeate, after substance removal or substance conversion, at least partially back into the retentate beyond the membrane separation unit.

To produce a more or less sweet, dealcoholized or slightly alcoholic beverage, according to one embodiment of the invention, a fermenter is placed in the permeate circuit of the membrane separation unit, a fermenter in which the sugar contained in the permeate is converted into alcohol, the alcohol is at least partially removed preferably in a subsequent dealcoholization device or by extraction by adding a second beverage and the desugarized and dealcoholized or slightly alcoholic permeate is fed back again into the permeate circuit beyond the fermenter.

To prevent too much flavoring substance from diffusing into the permeate, according to another embodiment of the invention there is placed, upstream from the membrane separation unit, a separation device which also operates according to the membrane process and into which the raw juice is introduced and conveyed as retentate to the retentate side of the membrane separation unit, and the permeate containing the flavoring substances is introduced into the retentate beyond the membrane separation unit.

Suitably, the separation limit of the upstream separation unit is less than the separation limit of the membrane separation unit, but is also in the boundary area of reverse osmosis and ultrafiltration.

In another embodiment of the invention, the substance removal or substance conversion is performed on the retentate side beyond the membrane separation unit. Here, the membrane of the membrane separation unit is suitably selected so that the permeate contains mainly the substances desired in the final product and the retentate contains the substances to be removed or converted.

In addition to an application for beverages, the process can also be used for isolation and concentration of sugar during extraction of sugar from sugar-containing solutions, especially in connection with a sugar solution obtained by enzymatic decomposition of cellulose, e.g., from wood.

In an especially advantageous embodiment of the invention for the production of an alcohol-free or reduced-alcohol beverage, the sugar contained in the retentate of the membrane separation unit is converted into alcohol by fermentation, the alcohol is at least partially removed by a subsequent dealcoholization and afterwards the flavoring substances, extracts, salts, acids, etc. contained in the permeate are again fed to the retentate after the fermentation and dealcoholization.

The advantages achieved with the invention consist particularly in that, by combining the membrane separation process and subsequent substance removal or substance conversion, a high selectivity and thus quality is achieved. The beverage desugarized and/or deacidified according to the process of the invention exhibits a high quality and is largely matched to special consumer requirements. The process according to the invention also makes possible a refining of the beverage by the removal of bad taste, which can arise from the use of bad raw material, unfavorable processing or too long a storage. The desugarization and modification of the ratio of sugar to acid makes possible a further adaptation to specific consumer requirements, e.g., by producing special, thirst-quenching beverages such as apple juice with little sugar and an increased acid/sugar ratio. Further, depending on the separation area of the membrane, a product with a high content of coloring substances, extractive substances, tanning substances, etc. can be achieved. In addition to taste, as a side effect the flavor can also be positively influenced, e.g. by new, useful flavor substances arising during fermentation or by removing bad-flavor by, e.g., adsorption and absorption processes.

BRIEF DESCRIPTION OF THE DRAWINGS

The invention is explained in further detail in the following description and in the drawing, which represents several embodiments. There are shown in.

Figure 1:
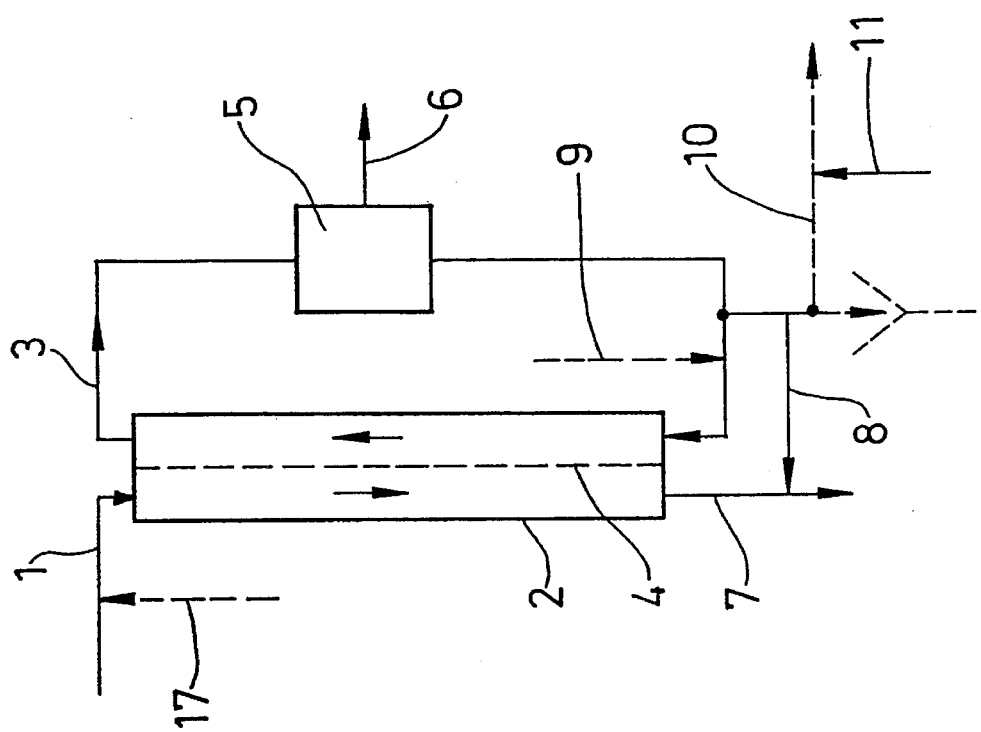
FIG. 1, a diagrammatic representation of the unit according to the invention with substance removal or substance conversion on the permeate side, FIG. 2, the unit according to FIG. 1 with desugarization by fermentation as well as a device for flavoring recovery and FIG. 3, another embodiment with substance removal or substance conversion on the retentate side.

The raw juice, from which the sugar is to be removed, is fed according to FIG. 1 by a pipe 1 to a membrane separation unit 2. Membrane separation unit 2 consists of a combined dialysis/reverse osmosis unit, in which the permeate flows countercurrent to the retentate. The unit is equipped with a special module that makes possible a permeate circuit 3 countercurrent to the retentate stream. But the use of an ultrafiltration unit with the same special module is also possible. The preferred separation area of membrane separation unit 2 lies in the boundary area between the low molecular and the macromolecular, i.e., in the boundary area between reverse osmosis and ultrafiltration, whose maximum separation limit is 5,000 daltons. In this area, colorants are still kept back. Further, macromolecular substances, e.g., extract substances, polyphenols, etc., pass through membrane 4 of membrane separation unit 2 to a greatly reduced extent.

A device 5 for selective substance removal or substance conversion is placed in permeate circuit 3. The substances to be removed or converted such as, e.g., sugar, acid, bad taste, alcohol from sugar, salts from sugar or acid are removed by a pipe 6. The permeate flowing countercurrent to the retentate is circulated and is again introduced into membrane separation unit 2 on the lower permeate side. The beverage freed from the undesired substance leaves membrane separation unit 2 by pipe 7 as retentate. After removal of the substance, part of the permeate is fed back by a pipe 8 again into the retentate beyond membrane separation unit 2.

In device 5, the sugar, acid or bad taste substance contained in the permeate is removed by the use of physical, chemical or biotechnological processes or is converted into beverage-compatible substances. Because membrane 4 of membrane separation unit 2 is selected in the separation limit so that primarily the substances to be removed diffuse and additionally a selective substance removal process is used on the permeate side, overall a high selectivity is produced compared to the individual steps. With the use of individual steps there exists the danger that too much is removed.

Device 5 for selective substance removal can, for example, operate in the known way according to the precipitation process. In particular for the removal of sugar, the known Stefan process or similar processes can be used. To remove acids, the known cellar treatment methods are suited, as well as enzymatic processes. Further, chromatographic processes, such as, e.g., the ion exclusion process, can be used for the removal of sugar. To remove bad taste, adsorption and absorption processes, e.g., by activated carbon, are suited. Further, sheet filters can be used, and the property of the filter beds is used not only to filter purely mechanically but also to agglutinate colloids. In principle, all taste-changing or refining cellar treatment processes and means can be used for substance removal. Here the effect with the processes according to the invention is milder, compared with conventional processes, since only the permeate is treated.

Finally, the substance removal can also be performed by liquid/liquid extraction. For this purpose, permeate circuit 3 is fed mineral water and/or at least another beverage as well as possible additives by a pipe 9. Both liquids are enriched with the substance to be removed, e.g., sugar, in permeate circuit 3 and withdrawn by a pipe 10 as another beverage that now contains the sugar removed from the first beverage. More additives can be mixed with the other beverage by a pipe 11. The first, desugarized beverage leaves membrane separation unit 2 as retentate by pipe 7. To intensify the substance exchange, suitable extraction equipment in known embodiments can be used.

Instead of the substance removal, a substance conversion can also be performed in device 5. For this purpose, biotechnological processes already common in the beverage sector are especially suited. According to FIG. 2, a fermenter 12 that converts the sugar contained in the permeate into alcohol is placed in permeate circuit 3. If the production of a slightly alcoholic beverage is desired, the alcohol is left in the permeate. Since at most an amount of alcohol is produced as there is sugar in the permeate, a more or less sweet alcoholic beverage results, as desired. In this way, an addition of foreign solvents, as is often necessary after a dealcoholization with conventional processes, is superfluous to arrive again at a desired beverage body. If, in contrast, the alcohol is to be reduced, the permeate can be completely or partially dealcoholized by the use of known processes. For this purpose, the fermented permeate enriched with alcohol is fed by a pipe 13 to a dealcoholization unit 14, in which the alcohol is removed. The dealcoholized permeate is again introduced by a pipe 15 into permeate circuit 3 beyond fermenter 12. The desugarized and dealcoholized permeate is introduced, together with water, extracts, acid, salts, flavoring residues including new flavoring substances, from the fermentation into the lower permeate side of membrane separation unit 2 and a part of it is fed back into the retentate by pipe 8.

In permeate circuit 3 there can be provided a deacidification process 16 in which acid is removed from the permeate in addition to, or as an alternative to, desugarization.

Instead of dealcoholization unit 14, similar to the already described desugarization by liquid/liquid extraction, the alcohol can be extracted from the permeate by adding a second beverage and thus a second, alcoholic beverage can be obtained.

As another measure for substance conversion, enzymatic processes can also be performed in device 5. Among these processes there is, for example, the so-called Navinginase, which is used and has become known to debitterize grapefruit juice. Since the enzymes practically are not lost on the permeate side, enzymatic processes simultaneously mean a cost saving.

To compensate for the water that diffuses into the permeate together with the substances to be removed through membrane 4 of membrane separation unit 2, beverage dilution water is fed by a pipe 17 to the raw juice before it enters membrane separation unit 2. Another compensation for the water results from the fact that part of the desugarized or converted permeate is fed back into the retentate by pipe 8.

Figure 2:
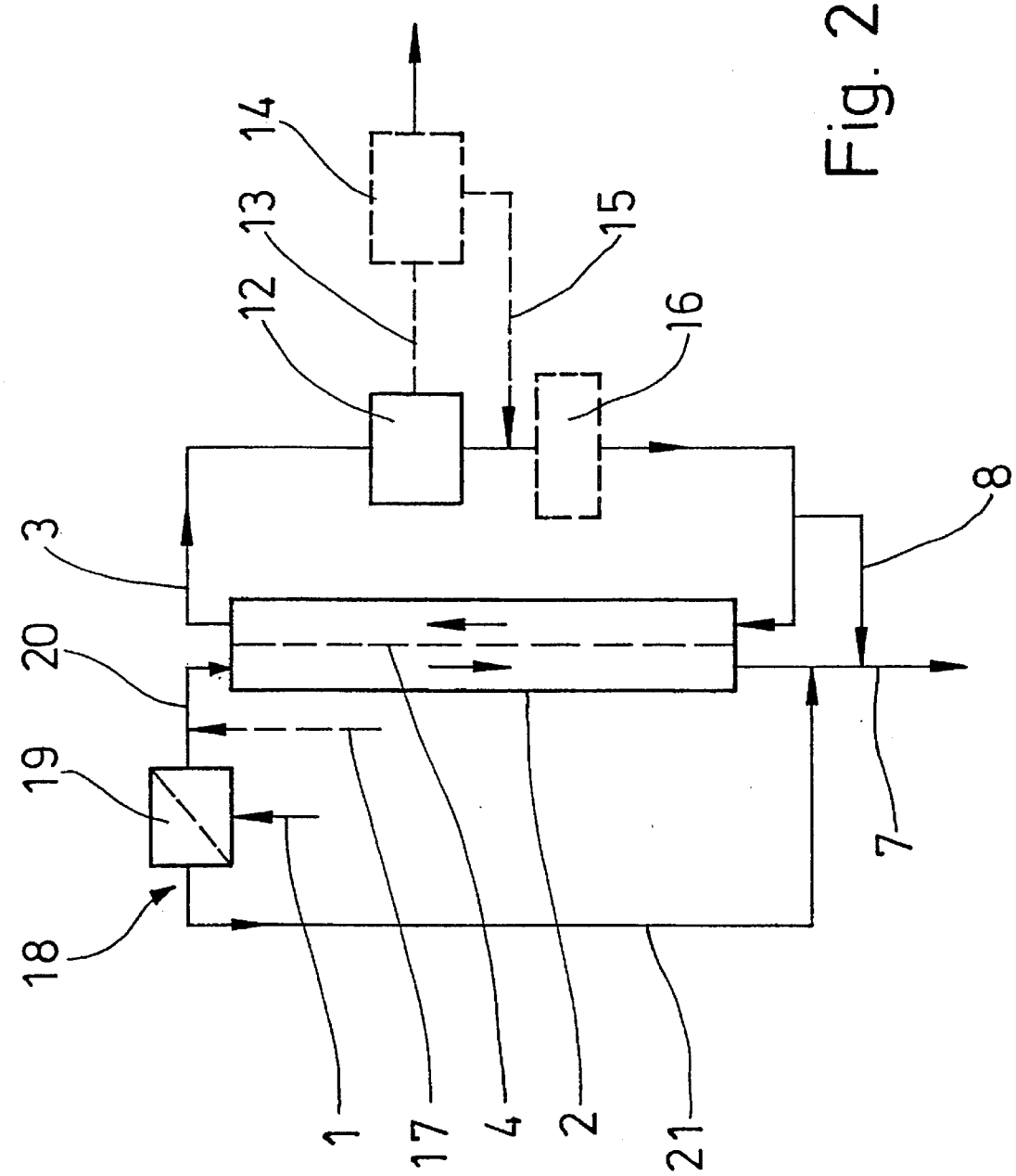

The unit according to FIG. 2 can additionally be equipped with a flavoring-recovery device 18. The latter consists of a separation device 19 upstream from membrane separation unit 2, a separation device that preferably operates also according to the membrane separation process to avoid a quality-degrading heat load of the beverage. The raw juice is introduced into separation unit 19 by pipe 1 and reaches membrane separation unit 2 by a pipe 20 as retentate. Consisting mainly of flavoring substances and some sugar, the permeate of separation device 19 is fed back into the retentate by a pipe 21 beyond membrane separation unit 2. In this way it is avoided that, e.g., during desugarization and/or deacidification, too many flavoring substances diffuse through membrane 4 of membrane separation unit 2 into the permeate and, during treatment, are degraded or lost on the permeate side. Such a device is placed if, for reasons of performance, work is done at relatively high pressures or an extremely high quality is to be achieved. A high concentration and high separation selectivity are not necessary, since the removed flavoring is immediately fed back again into the retentate stream. But this is true provided that the juice is not to be concentrated subsequently. Separation device 19 preferably has a somewhat lower separation limit than membrane separation unit 2, but it lies preferably also in the transition area between reverse osmosis and ultrafiltration.

Figure 3:
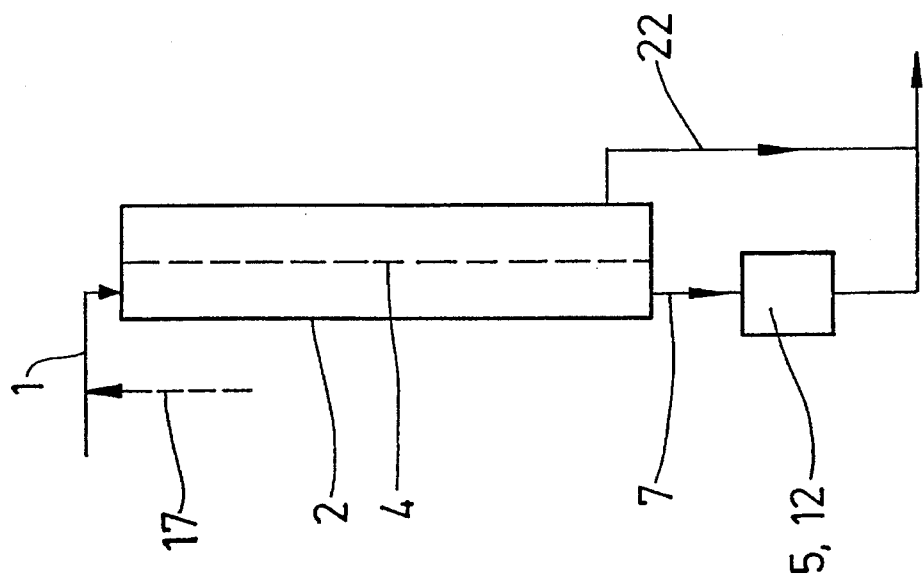

FIG. 3 represents an embodiment of the invention in which device 5 is placed for selective substance removal or substance conversion in the retentate stream beyond membrane separation unit 2. By suitable choice of membrane 4, mainly the substances to be removed remain in the retentate that leaves membrane separation unit 2 by pipe 7. For a desugarization, the separation limit of membrane 4 preferably lies in the transition area between reverse osmosis and ultrafiltration. The permeate that flows away by pipe 22, contains mainly the substances desired in the final product. This has the advantage that the beverage undergoes no changes as a result of the treatment methods for substance removal or substance conversion. For the substance removal or substance conversion occurring on the retentate side, the same is true as described in the embodiments according to FIGS. 1 and 2.

If, in the embodiment according to FIG. 3, the substance conversion to desugarize a certain beverage is performed by fermentation, i.e., by the use of fermenter 12, then in this way a beverage with slight alcohol content, little sugar and a high content of flavoring, extracts, acids and salts of the original beverage can be produced. The sugar retained in the retentate by suitable choice of membrane 4 is converted into alcohol in fermenter 12. By a subsequent dealcoholization, the alcohol content is at least reduced. The flavoring losses occurring in doing so are slight, since the flavoring substances, extracts, salts, acids and, to a limited extent, sugar contained in the original beverage already diffuse beforehand together with the water into the permeate, which is again fed to the retentate after the desugarization and dealcoholization and, together with the retentate, forms the new alcohol-reduced or alcohol-free, desugarized beverage.

The possibility also exists of combining the unit according to FIG. 3 with the unit according to FIG. 1 or 2.

I claim:

1. Process for selective removal of non-volatile substances, consisting of one or more of the non-volatile substances selected from the group consisting of sugar, acids and substances causing bad taste, from beverages or sugar-containing solutions, by membrane separation processes comprising the steps of subjecting the beverage or sugar-containing solution to a membrane separation process to separate a non-volatile substance therefrom to produce a permeate having the substance therein separated from the beverage and a retentate having a reduced quantity of said substance retained therein, subsequently removing at least a portion of the retained said substance from the retentate or the separated substance from the permeate, at least partially circulating the permeate from the membrane separation process in a permeate circuit, one of removing or converting the substance in the permeate circulating in the permeate circuit to achieve high selectivity of substance removal, and subsequently feeding back into the retentate at least a portion of the permeate with said separated substance removed therefrom.

2. Process according to claim 1 wherein the removal of the substance from the permeate or from the retentate of membrane separation unit (2) is performed by chemical precipitations.

3. Process according to claim 1 wherein, to remove the substance from the permeate or from the retentate, chromatographic processes are used.

4. Process according to claim 1 wherein, to remove the substance from the permeate or from the retentate, absorption and absorption processes are used.

5. Process according to claim 1 wherein, to remove the substance from the permeate or from the retentate, sheet filters are used.

6. Process according to claim 1 wherein the removal of the substance from the permeate or from the retentate is performed by liquid/liquid extraction.

7. Process according to claim 1, wherein the removal of the substance from the permeate or the retentate is performed by substance conversion comprising fermentation.

8. Process according to claim 1 wherein the removal of the substance from the permeate or from the retentate is performed by substance conversion by enzymatic processes.

9. Process according to claim 1, wherein, after substance removal or substance conversion, the permeate is partially fed back into the permeate beyond a membrane separation unit (2) for the membrane separation process.

10. Process according to claim 1 wherein there is placed in permeate circuit (3) a fermenter (12) in which sugars contained in the permeate are converted into alcohol, the alcohol is at least partially removed in a subsequent dealcoholization device (14) or by extraction by addition of at least another beverage and the desugarized and dealcoholized or alcoholic permeate is again fed back into permeate circuit (3) beyond the fermenter (12).

11. Process according to claim 10 wherein the permeate contains flavoring substances, extracts, salts and acids, and to produce an alcohol-free or reduced-alcohol beverage, the sugars contained in the retentate are converted into alcohol by fermentation, the alcohol is at least partially removed by a subsequent dealcoholization and afterward the flavoring substances, extracts, salts, and acids contained in the permeate are again fed back to the retentate after fermentation and dealcoholization.

12. Process for selective removal of non-volatile substances, consisting of one or more of the non-volatile substances selected from the group consisting of sugar, acids and substances causing bad taste, from beverages or sugar-containing solutions by membrane separation processes comprising the steps of subjecting the beverage or sugar-containing solution to a membrane separation process to separate a non-volatile substance therefrom to produce a permeate having the substance therein separated from the beverage and a retentate having a reduced quantity of said substance retained therein, subsequently removing at least a portion of the retained said substance from the retentate or the separated substance from the permeate, at least partially circulating the permeate from the membrane separation process in a permeate circuit, one of removing or converting the substance in the permeate circulating in the permeate circuit to achieve high selectivity of substance removal, and subsequently feeding back into the permeate at least a portion of the permeate with said separated substance removed therefrom.

13. Process according to claim 12 wherein the removal of the substance from the permeate or from the retentate of membrane separation unit (2) is performed by chemical precipitations.

14. Process according to claim 12 wherein, to remove the substance from the permeate or from the retentate, chromatographic processes are used.

15. Process according to claim 12 wherein, to remove the substance from the permeate or from the retentate, absorption and absorption processes are used.

16. Process according to claim 12 wherein, to remove the substance from the permeate or from the retentate, sheet filters are used.

17. Process according to claim 12 wherein the removal of the substance from the permeate or from the retentate is performed by liquid/liquid extraction.

18. Process according to claim 12 wherein the removal of the substance from the permeate or the retentate is performed by substance conversion comprising fermentation.

19. Process according to claim 12 wherein the removal of the substance from the permeate or from the retentate is performed by substance conversion by enzymatic processes.

20. Process according to claim 12, wherein, after substance removal or substance conversion, the permeate is partially fed back into the permeate beyond a membrane separation unit (2) for the membrane separation process.

21. Process according to claim 12 wherein there is placed in permeate circuit (3) a fermenter (12) in which sugars contained in the permeate are converted into alcohol, the alcohol is at least partially removed in a subsequent dealcoholization device (14) or by extraction by addition of at least another beverage and the desugarized and dealcoholized or alcoholic permeate is again fed back into permeate circuit (3) beyond the fermenter (12).

22. Process according to claim 51 wherein the permeate contains flavoring substances, extracts, salts and acids, and to produce an alcohol-free or reduced-alcohol beverage, the sugars contained in the retentate are converted into alcohol by fermentation, the alcohol is at least partially removed by a subsequent dealcoholization and afterward the flavoring substances, extracts, salts, and acids contained in the permeate are again fed back to the retentate after fermentation and dealcoholization.

* * * * *